US012696977B2

(12) United States Patent
Willnow

(10) Patent No.: US 12,696,977 B2
(45) **Date of Patent: \*Aug. 4, 2026**

(54) TANK RACK

(71) Applicant: Adrian Steel Company, Adrian, MI (US)

(72) Inventor: Elizabeth Elaine Willnow, Adrian, MI (US)

(73) Assignee: Adrian Steel Company, Adrian, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/098,345

(22) Filed: Apr. 2, 2025

(65) Prior Publication Data

US 2025/0228364 A1       Jul. 17, 2025

Related U.S. Application Data

(60) Division of application No. 18/641,583, filed on Apr. 22, 2024, now Pat. No. 12,317,998, which is a continuation of application No. 17/822,160, filed on Aug. 25, 2022, now Pat. No. 12,048,377.

(60) Provisional application No. 63/264,474, filed on Nov. 23, 2021.

(51) Int. Cl.
| | |
|---|---|
| *A47B 81/00* | (2006.01) |
| *A47F 7/28* | (2006.01) |
| *B60P 7/06* | (2006.01) |
| *A47B 57/04* | (2006.01) |
| *A47B 73/00* | (2006.01) |

(52) U.S. Cl.
CPC ........... *A47B 81/007* (2013.01); *A47F 7/281* (2013.01); *B60P 7/06* (2013.01); *A47B 57/04* (2013.01); *A47B 73/00* (2013.01)

(58) Field of Classification Search
CPC ....... A47B 81/007; A47B 57/04; A47B 73/00; A47B 81/00; A47B 81/005; A47B 55/00; A47B 57/06; A47B 57/18; A47B 57/30; A47B 57/44; A47F 7/281; A47F 7/28; A47F 7/283; B60P 7/06
See application file for complete search history.

(56) References Cited

U.S. PATENT DOCUMENTS

| | | | | | |
|---|---|---|---|---|---|
| 1,304,902 | A | * | 5/1919 | Pond ......................... | A47F 7/04 211/23 |
| 1,351,923 | A | * | 9/1920 | Nelson ................... | B65G 65/24 248/142 |
| 1,368,192 | A | * | 2/1921 | Olmstead ............. | A47B 81/007 276/44 |
| 1,627,080 | A | * | 5/1927 | Fellenbaum ......... | A47B 81/007 134/159 |
| 1,688,412 | A | * | 10/1928 | Darby ................... | A63B 55/10 211/70.2 |
| 2,455,017 | A | * | 11/1948 | Mccormick .......... | A47B 81/007 211/85.18 |
| 2,781,065 | A | * | 2/1957 | Hofacer ................. | F16N 37/00 211/133.1 |

(Continued)

*Primary Examiner* — Devin K Barnett
(74) *Attorney, Agent, or Firm* — Marshall & Melhorn, LLC

(57)       ABSTRACT
A tank rack may have a back frame member and at least two tank support members spaced apart from one another along the back frame member. Each of the tank support members may have two inner sections, two outer sections and a rear portion. The rear portion may be connected to the back frame member.

17 Claims, 4 Drawing Sheets

(56)                    References Cited

U.S. PATENT DOCUMENTS

| | | | | |
|---|---|---|---|---|
| 2,828,023 A * | 3/1958 | Berra | A47B 81/007 | 211/85.5 |
| 2,851,064 A * | 9/1958 | Mccowan | A47F 7/288 | D20/19 |
| 3,168,229 A * | 2/1965 | Heifetz | A47G 19/08 | 211/49.1 |
| 3,192,970 A * | 7/1965 | Allen | F16N 33/00 | 211/150 |
| 3,616,937 A * | 11/1971 | Frame | A47B 87/0215 | 211/24 |
| 3,701,463 A * | 10/1972 | Goss | F17C 13/084 | 294/142 |
| 3,942,752 A * | 3/1976 | Shaw | F16M 11/22 | 248/311.2 |
| D239,901 S * | 5/1976 | Goulder | D6/678.1 | |
| 4,013,201 A * | 3/1977 | Potter | A45F 3/047 | D3/216 |
| 4,168,007 A * | 9/1979 | Rohatensky | F17C 13/084 | 248/154 |
| 4,175,666 A * | 11/1979 | Smith | B65D 61/00 | 403/374.2 |
| 4,953,719 A * | 9/1990 | Spamer | A47B 87/0223 | 211/188 |
| 4,974,800 A * | 12/1990 | Tyson, Jr. | F17C 13/084 | 248/143 |
| 4,998,629 A * | 3/1991 | Cheng | G07F 11/62 | 211/74 |
| D336,408 S * | 6/1993 | Tersch | D7/619.1 | |
| 5,215,199 A * | 6/1993 | Bejarano | A47B 55/02 | 211/74 |
| 5,370,245 A * | 12/1994 | Tersch | A47B 73/006 | 211/74 |
| 5,553,707 A * | 9/1996 | Lion | A45F 5/00 | 224/678 |
| 5,626,241 A * | 5/1997 | Holden | A47F 7/04 | 108/55.3 |
| D390,726 S * | 2/1998 | Arvans | D7/704 | |
| 5,806,892 A * | 9/1998 | Colburn | B66F 9/07518 | 280/834 |
| D399,671 S * | 10/1998 | Arvans | D7/601 | |
| 5,954,099 A * | 9/1999 | Princiotta | B60P 3/055 | 141/237 |
| 5,984,115 A * | 11/1999 | Koestenblatt | G11B 33/0472 | 211/49.1 |
| 6,003,654 A * | 12/1999 | Webber | B65G 65/00 | 198/408 |
| 6,019,230 A * | 2/2000 | Hayashi | G11B 33/0466 | 211/41.12 |
| 6,047,866 A * | 4/2000 | Brown | B67D 3/0083 | 222/506 |
| 6,079,339 A * | 6/2000 | Houk, Jr. | A47B 87/0223 | 211/186 |
| 6,135,297 A * | 10/2000 | DeShazo | A47B 81/007 | 211/74 |
| D436,490 S * | 1/2001 | Kwok | D6/682.2 | |
| 6,290,074 B1 * | 9/2001 | Syvuk | A47F 7/283 | D7/619.1 |
| 6,494,549 B2 * | 12/2002 | Van Daalwyk | F17C 13/084 | 312/45 |
| D488,019 S * | 4/2004 | Hassett | D6/630 | |
| 6,776,378 B1 * | 8/2004 | Yu | A47B 81/007 | 248/176.1 |
| 6,811,042 B2 * | 11/2004 | Kelly | A47B 81/007 | 211/74 |
| 7,914,016 B2 * | 3/2011 | Guttormson | B62B 1/264 | 211/74 |
| 8,016,300 B2 * | 9/2011 | Cramer | B65G 7/04 | 137/899.3 |
| D661,371 S * | 6/2012 | Willard | D23/206 | |
| 9,445,670 B1 * | 9/2016 | Stiefel | A47F 5/08 | |
| 9,545,884 B1 * | 1/2017 | Clarke-Stapleton | B60R 15/04 | |
| 9,586,803 B1 * | 3/2017 | Snyker | B67D 3/0029 | |
| 9,884,552 B2 * | 2/2018 | Sloan | F17C 13/083 | |
| D818,769 S * | 5/2018 | Snyker | D7/397 | |
| 10,159,321 B1 * | 12/2018 | Gooden | A45C 11/02 | |
| 10,278,528 B1 * | 5/2019 | Godsby | A47G 25/10 | |
| 10,718,469 B2 * | 7/2020 | Sloan | F17C 13/08 | |
| D1,026,508 S * | 5/2024 | Yu | D6/675.1 | |
| 2005/0029298 A1 * | 2/2005 | Sun | B67D 3/0029 | 222/166 |
| 2005/0184020 A1 * | 8/2005 | Thibodeau | A47B 81/007 | 211/85.18 |
| 2006/0261019 A1 * | 11/2006 | Chao | A45F 5/02 | 211/74 |
| 2007/0116552 A1 * | 5/2007 | Patterson | F17C 13/084 | 414/810 |
| 2008/0124184 A1 * | 5/2008 | Sheckells | B60P 3/055 | 410/78 |
| 2008/0251477 A1 * | 10/2008 | Fecko | B65G 1/02 | 211/74 |
| 2012/0211452 A1 * | 8/2012 | Dovell | A47B 73/00 | 211/74 |
| 2016/0332514 A1 * | 11/2016 | Arold | B60K 15/07 | |
| 2017/0057348 A1 * | 3/2017 | Arold | F17C 13/084 | |

* cited by examiner

TANK RACK

FIELD

A tank rack for selectively retaining tanks, such as tanks adapted to retain a liquid therein, is provided.

BACKGROUND

Tanks are well-known devices used to transport materials, such as liquids and gas, which can sometime be under pressure in the tanks. In some instances, the liquids and gases may be flammable and explosive. Thus, care is often required when transporting the tanks to ensure they remain safe and secure. The tanks are often transported in vehicles, and shelving or racks have been developed to hold the tanks in vehicles.

The tanks may be constructed of robust materials to ensure their integrity, particularly where they may be used for the purposes mentioned above. The materials, as well as the size of the tanks, often contributes to their weight, which can be in excess of 30 pounds and can easily exceed 50 pounds. For those handling such heavy objects, injuries are common.

The prior designs for transportation of the tanks in vehicles has lead to several disadvantages. In some cases, the tanks are just sat upright in the vehicle, which can lead to damage to the transportation vehicle. In other cases, tanks are simply put on flat shelves and secured to the shelves with cords or the like. This is problematic for a number of reasons. First, it does not result in an optimally secured tank as the cords may not be adequate to secure the tanks. Second, it can be difficult and time consuming to load and/or unload the tanks from the shelves. This includes requiring the worker to climb into the vehicle to locate a tank on the shelf or pull a tank from a shelf.

In view of the disadvantages associated with the prior art designs, it would be advantageous to have a robust system for securing tanks in a vehicle. It would also be advantageous for the system to provide access to the tanks in a location that was ergonomically ideal for accessing the system both from within the vehicle and outside the vehicle.

SUMMARY

In one aspect, a tank rack may have a back frame member. The tank rack may also have a top frame member extending transverse the back frame member. The tank rack may also have an upper frame member extending transverse the top frame member and parallel the back frame member. The upper frame member may have first and second arms. First and second side frame members may be connected to the first and second arms, respectively. A first tank support member may have forward portions connected to both the first and second side frame members. The first tank support member may also have a rear portion connected to the back frame member.

In another aspect a tank rack may have a back frame member and a plurality of tank support members spaced apart from one another along the back frame member. The tank rack may also have two inner sections, two outer sections and a rear portion. The inner and outer sections and the rear portion may form a U-shape. The rear portion may be connected to the back frame member.

DESCRIPTION OF EXEMPLARY EMBODIMENTS

It is to be understood that the device may assume various alternative orientations and step sequences, except where expressly specified to the contrary. It is also to be understood that the specific devices and processes illustrated in the attached drawings, and described in the following specification are simply exemplary embodiments. Hence, specific dimensions, directions or other physical characteristics relating to the embodiments disclosed are not to be considered as limiting.

Figure 8:
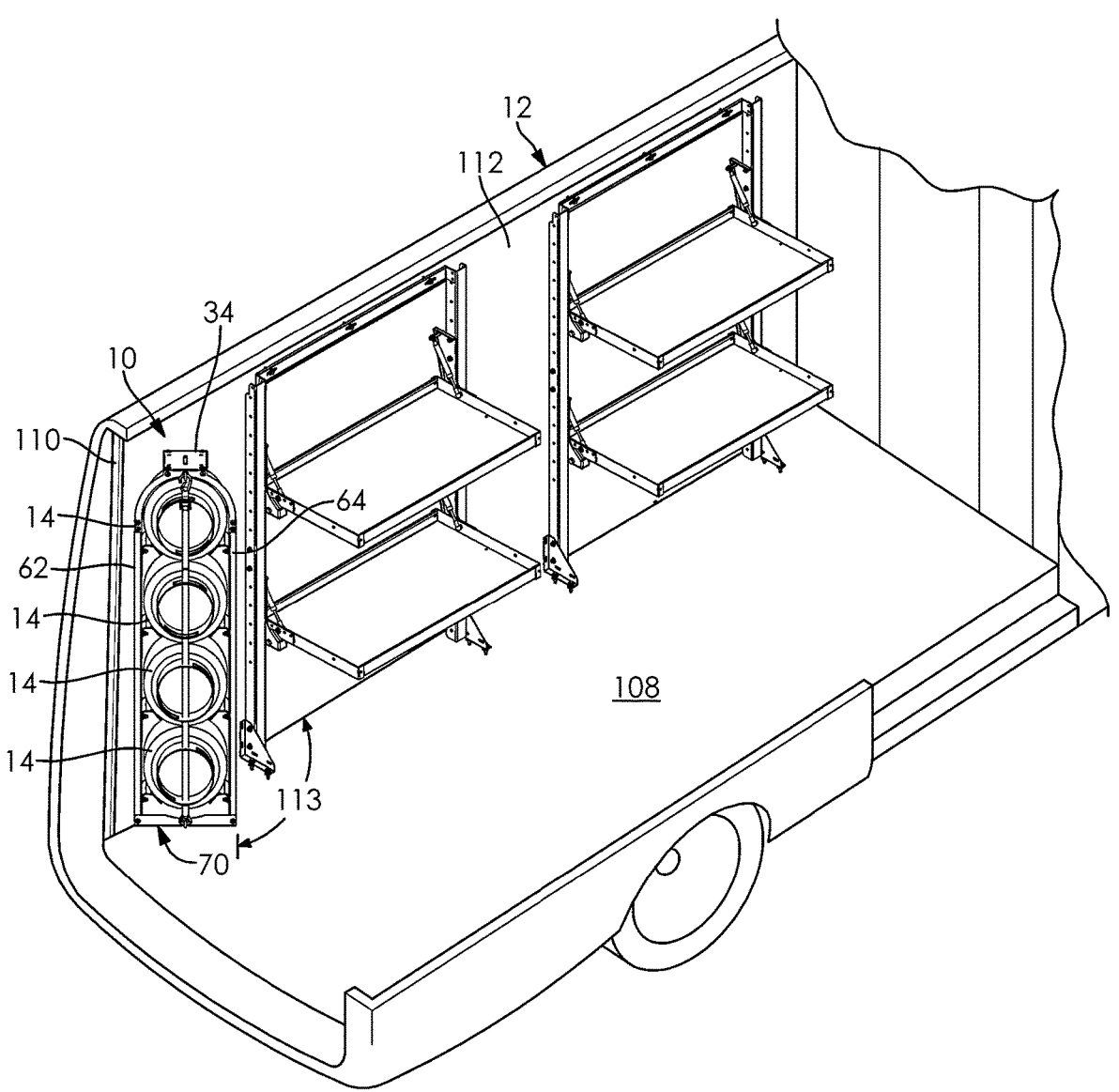
FIG. 8 is one embodiment of the tank rack located in a vehicle.

Turning now to the figures, one embodiment of a tank rack 10 is schematically depicted. The rack 10 may be adapted for use in a variety of environments including stationary and mobile applications. Stationary applications may be such as buildings while mobile applications may be such as vehicles. The vehicles may be land vehicles but others are permissible. The rack may be particularly adapted for cargo vans and related service vehicles 12, as shown in FIG. 8.

The rack 10 may be used to store one or more tanks 14 thereon, which are schematically shown in FIGS. 3-8. The tanks 14 may be adapted for any substance, and the tanks 14 may be of many different sizes and shapes. In one embodiment, one or more propane tanks may be selectively stored on the rack 10. In such a case, the tanks 14 may be such as 3-10 gallon propane tanks.

Figures 1, 2:
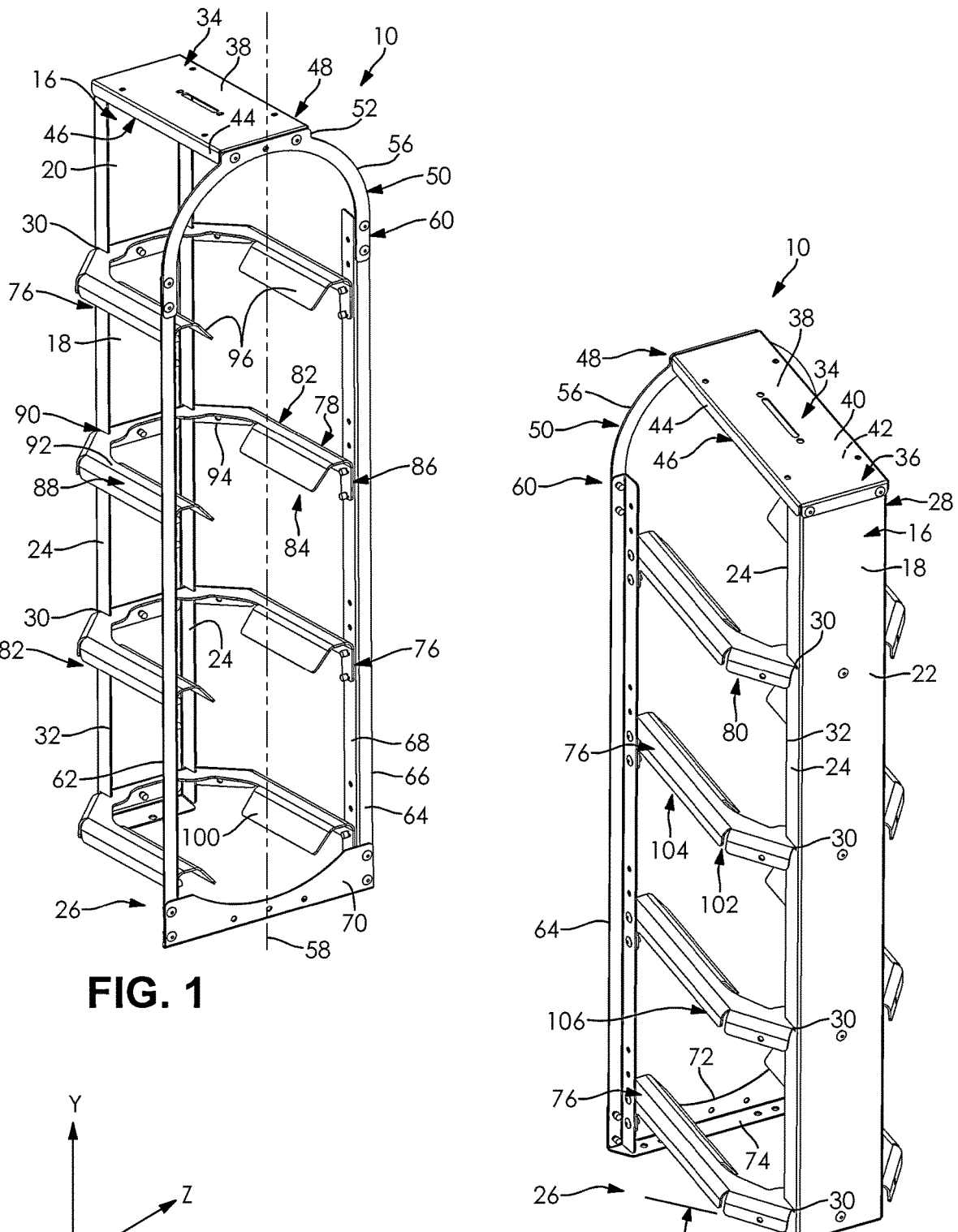
FIG. 1 is a front perspective view of one embodiment of a tank rack.
FIG. 2 is a rear perspective view of the tank rack from FIG. 1.
Figure 3:
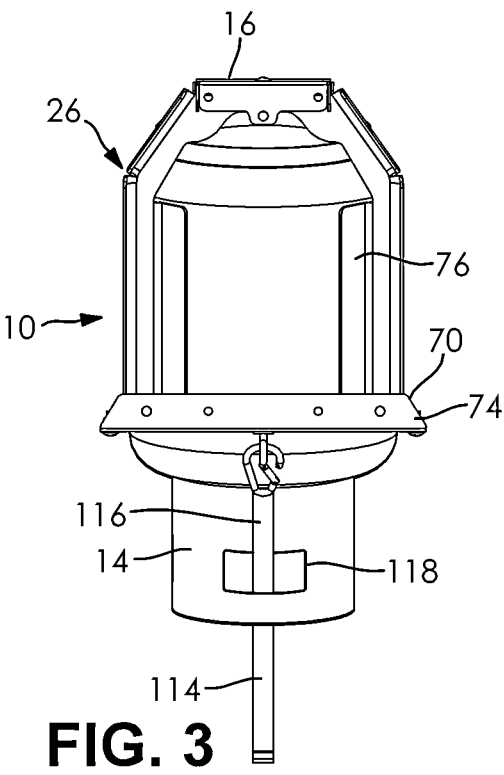
FIG. 3 is a bottom view of the tank rack with one embodiment of at least one tank located thereon.
Figure 4:
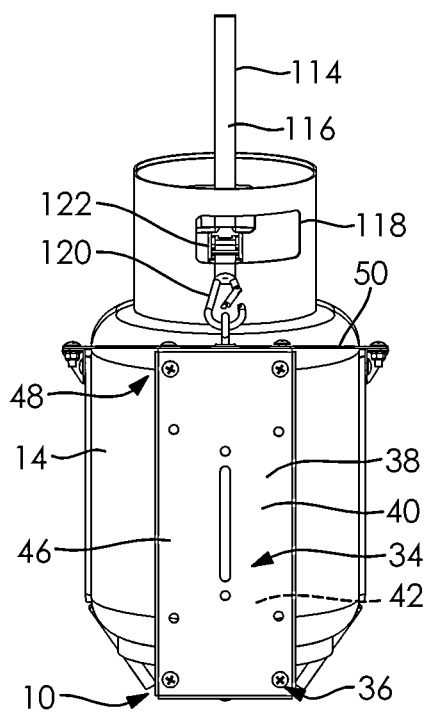
FIG. 4 is a top view of the tank rank with one embodiment of at least one tank located thereon.
Figure 5:
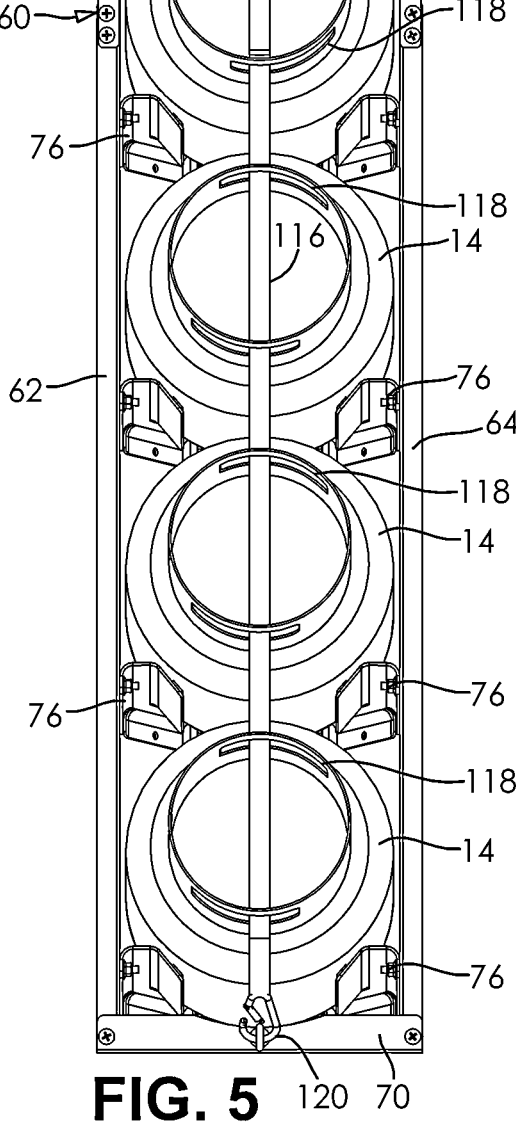
FIG. 5 is a front view of the tank rack with one embodiment of tanks located thereon.
Figures 6, 7:
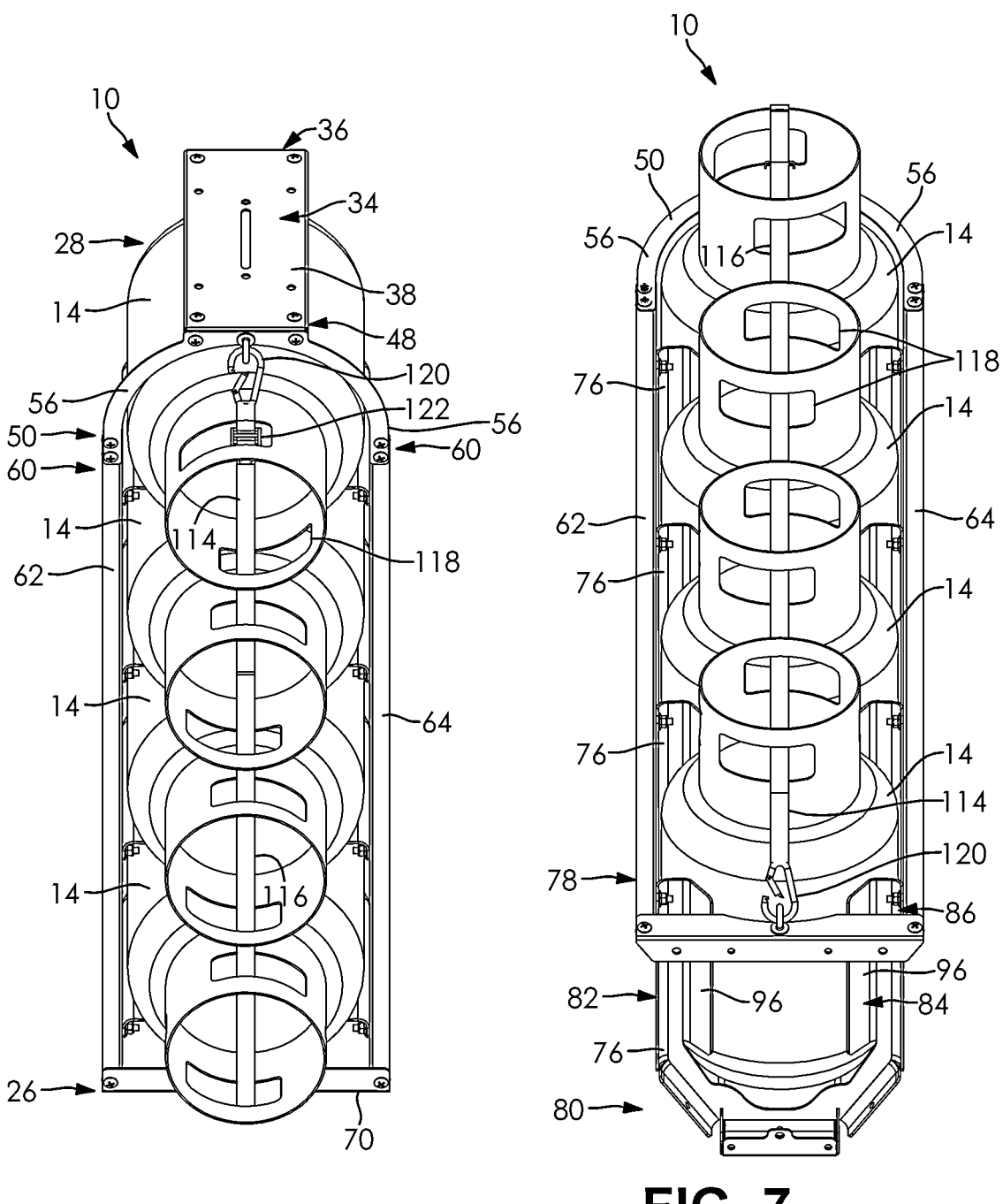
FIG. 6 is an upper, front perspective view of the tank rack with one embodiment of tanks located thereon.
FIG. 7 is a front, lower perspective view of the tank rack with one embodiment of tanks located thereon.

In some embodiments, the rack 10 may have a back frame member 16 as best seen in FIGS. 1 and 2. The back frame member 16 may be a single piece, but it may be possible for the back frame member 16 to be comprised of two or more pieces that have been secured together such as through mechanical fasteners and/or welding.

The back frame member 16 may have a back panel 18 with substantially planar front and back surfaces 20, 22 along the height of the back panel 18, which between them define a substantially constant thickness. The back panel 18 may have a generally rectangular shape and the longest dimension of the back panel 18 may extend along a y-axis of an x-y-z coordinate system. The coordinate system is depicted on selected figures.

The back frame member 16 is depicted as solid. In other embodiments, however, the back frame member 16 may have openings or the back frame member 16 may simply be two rods, posts or angle irons that are spaced from one another by a gap.

In some embodiments, side flanges 24 may extend along either side of the back panel 18. Preferably, the side flanges 24 are on both sides of the back panel 18. The side flanges 24 may extend for all, some or none of the height of the back panel 18. It may be preferred that the side flanges 24 extend substantially along both sides of the back panel 18 from a base portion 26 of the back frame member 16 to an upper portion 28 of the back frame member 16.

The side flanges 24 may extend in a substantially transverse direction from the primary direction of the back frame member 16. In some embodiments, this has the side flanges 24 extending in the z-direction, away from the front surface 20 of the panel 18. The side flanges 24 may extend substantially parallel one another and sandwich the back panel 18 between them.

In some embodiments, slots 30 may be located at predetermined distances along the side flanges 24. Preferably, individual slots of pairs of slots 30 in the side flanges 24 are vertically aligned so as to be coplanar with one another. The slots 30 may extend from forward edges 32 of the side flanges 24 toward the back panel 18. In some cases, it may be that the slots 30 reach the back panel 18.

A top frame member 34 may be connected to the upper portion 28 of the back frame member 16. In some cases, a back portion 36 of the top frame member 34 may be connected to the back frame member 16. The connection maybe such as through mechanical fasteners, but adhesives and/or welding may also be used.

The top frame member 34 may extend substantially transverse the primary direction of the back frame member 16. Thus, the top frame member 34 may extend primarily in the z-direction. The top frame member 34 may have a top panel 38 with substantially planar upper and lower surfaces 40, 42, which between them may define a substantially constant thickness.

The top frame member 34 may have flanges 44 that extend generally transverse from the top panel 38. The flanges 44 may be located along at least along both sides 46, a front portion 48 and the back portion 36 of the top frame member 34. The flanges 44 along the sides 46 may be parallel one another with the flanges 44 along the front end base portions 48, 36 being orienteered transverse the side flanges 44. The flanges 44 may all extend substantially downward away from the upper surface 40, such as in the y-direction.

The front portion 48 of the top frame member 34 may be connected to an upper frame member 50. The connection may be such as through mechanical fasteners, but adhesives and/or welding may also be used.

In some embodiments (not shown), the upper frame member 50 may have a connection flange 52 that at least partially overlaps the upper surface 40 of the top panel 38. Mechanical fasteners may be located through the connection flange 52 and into the top panel 38 to secure them together. In other embodiments the connection flange 52 is not designed to overlap with the upper surface 40 of the top panel 38 but instead it extends transverse the top panel 38. The connection flange 52 may be parallel one of the flanges 44 of the top panel 38 and mechanical fasteners may connect them.

The upper frame member 50 may form a general U-shape, but other shapes may be used. An upper base 54 of the upper frame member 50 may be connected to the connection flange 52. Two arms 50 of the upper frame member 50 may extend in an arcuate fashion downwardly from the connection flange 52. The arms 50 may be substantially symmetrical about a longitudinal axis 58 of the rack 10 that extends parallel the y-axis. The back panel 18 of the back frame member 16 also extends along the y-axis and so the arms 50 may be parallel but not coplanar with the panel 18. The arms 50 may also be substantially planar in the z-plane with their thickness dimension being in the z-plane. In some embodiments, the rack 10 may be substantially symmetrical about the axis 58.

End portions 60 of the arms 56 may terminate at substantially the same vertical plane along the axis 58. Each end portion 60 may be connected to respective first and second side frame members 62, 64. The connection of the arm end portion 60 to the first and second side frame members 62, 64 may be such as through mechanical fasteners, but welding and/or adhesives may also be used. In other embodiments, the arms 56 may be unitary, one piece and integrally formed with the first and second side frame members 62, 64.

The first and second side frame members 62, 64 may extend substantially continuously the height of the rack 10 from the upper frame member 50 to the base portion 26 of the rack 10. The side frame members 62, 64 may each be constructed of a single piece but in some embodiments the side frame members may be constructed of multiple pieces.

The first and second side frame members 62, 64 may be substantially the same in terms of shape and size. For example, in one embodiment, the side frame members 62, 64 may be comprised of forward and rear facing flanges 66, 68. In such a case, the flanges 66, 68 may be oriented at an angle to one another such as at approximately 90 degrees to give them an L-shaped cross-section. In a preferred embodiment, the forward facing flanges 66, which may be substantially planar in the z-plane, may be substantially coplanar with the upper frame member arms 56.

The first and/or second side frame members 62, 64 may be connected to a bottom frame member 70. In some cases, the bottom frame member 70 may extend between the two side frame members 62, 64 to connect them. The bottom frame member 70 may extend primarily in the x-direction. The bottom frame member 70 may have a general L-shape with one leg 72 of the L connected to the forward facing flanges 66 of the side frame members 62, 64. The other leg 74 may extend toward the back frame member 16.

The rear facing flanges 68 may extend toward the back frame member 16, such as in the z-direction. The rear facing flanges 68 may provide a connection support for at least one tank support member 76 associated with the rack 10. In some embodiments, forward end portions 78 of a tank support member 76 are connected to the rear facing flanges 68. The connection may be through mechanical fasteners, but welding and/or adhesives may also be used. In another embodiment, the tank support member 76 may be connected to the forward facing flanges 66.

The tank support member 76 may also be comprised of a rear portion 80. The rear portion 80 may be connected to the back frame member 16. The connection may be through mechanical fasteners but welding and/or adhesives may also be used.

The rear portion 80 of the tank support member 76 may be located on a different y-plane than a y-plane for the forward end portions 78 of the tank support member 76. In some embodiments, forward end portions 78, which may be coplanar with one another, may be located above the rear portion 80 on the y-axis. The difference in vertical height of the forward end portions 78 compared with the rear portion 80 may result in the tank support member 76 being located in the rack 10 at an angle. The angle may assist in selectively maintaining tanks 14 on the rack 10 by using gravity to slide and retain tanks toward and/or against the back frame member 16.

The angle may be such as an acute angle measured from a plane extending transverse the longitudinal axis 58. The angle may increase from the rear portion 80 to the forward end portions 78.

The tank support member 76 may have a general U-shape. The shape may be formed from two arm portions 82 extending outward, such as along the z-axis, substantially symmetrically from the rear portion 80. The arm portions 82 may be connected to the first and second side frame members 62, 64 via the forward end portions 78. The connection may be through mechanical fasteners but welding and/or adhesives may be used as well. The arm portions 82, being a part of the forward end portions 78, are also angled and may provide a tank support surface generally from the forward end portions 78 to the rear portion 80. The tank support surface may be continuous or non-continuous. The tank support member 76 may be integrally formed, one piece and unitary or it may be comprised of a plurality of pieces.

In some embodiments, the arm portions 82 and/or the rear portion 80 of the tank support member 76 may have support portions 84 and attachment portions 86. Certain parts of the attachment portions 86 may be substantially coplanar (except for the thickness of the attachment portions) with the back panel 18 of the back frame member 16 and the rear facing flanges 68. For example, the attachment portion 86 at the rear portion 80 of the tank support member 76 may be substantially coplanar with, and directly attached to, the back panel 18 of the back frame member 16. The attachment portion 86 at the rear portion 80 of the tank support member 76 may be plate-like in its construction and thus, when attached to the back panel 18 of the back frame member 16, besides the thickness of the attachment portion 86, it is substantially coplanar with the back panel 18.

The attachment portions 86 at the forward end portions 78 of the arm portions 82 may also be plate-like in their construction which enables them to lay flat against the rear facing flanges 68 for connection therewith. This also positions the attachment portions 86 at this location substantially coplanar with the rear facing flanges 68, respectively.

The attachment portions 86 of the tank support member 76 may extend about the tank support member 76. In some embodiments, the attachment portions 86 may extend substantially continuously about the tank support member 76. In other embodiments, there may be gaps in the attachment portions 86.

In some cases, at least portions of the attachment portions 86 may be located at least partially below the support portions 84. In some cases, at least portions of the support portions 84 of the tank support member 76 may be generally located transverse the attachment portions 86. These support portions 84 may extend inwardly and away from the back frame member 16 and the first and second side frame members 62, 64. In some embodiments, an outer portion 88 of the support portion 84 may be substantially transverse the attachment portions 86. The outer portion 88 may extend substantially continuously about the support portion 84.

It may be that in some embodiments at least a portion of the support portion 84 may be located in the slots 30 of the side flanges 24 to provide strength, support and rigidity to the tank support member 76. In such cases, it may be that a planar, rear portion 90 of the support portion 84 may be located a pair of coplanar slots 30. Attachment portions 86, which may extend transversely with respect to the planar support portion 84, may be located on either side, and between, the slot 30 pair. When located in the slots 30, the side flanges 24 bound the upper and lower surfaces 92, 94 of the support portion 84.

In some cases, support tabs 96 may extend from the support portions 84. The support tabs 96 may comprise an inner portion 98 of the support portion 84. The support tabs 96 may extend entirely about the support portions 84 or only selected portions thereof. In the depicted embodiment, the support tabs 98 may extend just from the arm portions 82 of the tank support member 76. In some cases, the support tabs 98 may only extend from just portions of the arm portions 82. The support tabs 98 may extend inwardly from the support portions 84, such as somewhat towards one another, which may be along the x-axis, but they may also extend downwardly, such as along the y-direction. In such an embodiment, where the support tabs 98 extend downwardly, they may do so between an angle of approximately 30-70 degrees from the support portions 84. In a preferred embodiment, the angle may be such as approximately 45 degrees as measured from a plane transverse from the longitudinal axis 58. The support tabs 98, together with the support portions 84, may provide the arms 56 with a multi-faceted, multi-dimensional support surface 100 to engage a tank 14. The angled nature of the support surface 100 assists in supporting tanks 14 of various sizes and shaped thereon.

In some embodiments, each arm 56 may be comprised of a first inner section 102 and a second outer section 104. The first inner section 102 may be located between the second outer section 104 and the rear portion 80 of the tank support member 76. In certain embodiments, the tabs 96 may extend from the second outer section 104. The sections 102, 104 may be connected to one another by a transition portion 106. The transition portion 106 may be such as a radiused elbow.

The first two inner sections 102, the two second outer sections 104 and the rear portion 80 may bound a central open portion of each tank support member 76. The central open portion may have the same size and shape as one another among the tank support members 76 in the rack 10. In some embodiments, each central open portion may have aligned with one another along the longitudinal axis 58 of the rack.

Each second outer section 104 may extend from the side frame members 62, 64 generally transversely and toward the back frame member 16. The two outer sections terminate at first and second side frame members to provide an unobstructed front portion of the tank rank.

To create the U-shape for the tank support member 76, each first inner section 102 may have an angle 107 with respect to both the second outer section 104 and the back frame member 16. In some embodiments, the first inner section 102 may be angled at approximately 30-70 degrees to both the second outer section 104 and the back frame member 16. In what may be a preferred embodiment, the first inner section 102 may be angled at approximately 45 degrees with respect to the second outer section 104 and the back frame member 16, respectively. Each second outer section 104 may extend in a substantially transverse direction from the back panel 18. In some embodiments, each second outer section 104 may extend about 45 degrees from each respective first inner section 102.

It has been found that providing an angle to the tank support member 76 advantageously reduces the space the rack 10 takes up on a floor 108 or other substrate. It has also been found that the angle of the tank support member 76 permits the rack 10 to be located at an advantageous angle for loading and unloading the rack 10. For example, as shown in FIG. 8, if the rack 10 is located near a rear pillar 110 of the vehicle 12, the rack 10 can be positioned such that the first inner section 102 is located against a side wall 112 of the vehicle 12. This positions the rack 10, due to the angle of the first inner section 102, at a set angle 113 with respect to the side wall 112. The angle 113 may be as approximately 45 degrees. The advantage associated with this angle is that the contents of the rack 10 are readily accessible from the rear of the vehicle 12. More particularly, this may mean that a user does not have to strain to reach the rack 10 contents if the rack 10 is located at the traditional 90 degree orientation with respect to the vehicle side wall 112. Instead, the tanks 14 are angled so that they can be added to, or removed from, the rack 10 at approximately 45 degrees with respect to a rear plane of the vehicle 12. Of course, the 45 degree angle also facilitates access to the rack from within the vehicle 12 as well.

As shown in the various figures, it may be possible for the rack 10 to have more than one tank support member 76. In such a case, the tank support members 76 may be equally spaced along the y-axis of the rack 10, but other spacing is permissible. Further, each tank support member 76 may be positioned within the rack 10 such that the rear portions 80 are located below the respective arm portions 82 to the same degree, but it may also be possible for the angle to differ among the members 76.

The rack 10 is preferably constructed of a robust material capable of supporting one or more full tanks 14 thereon. Such a material may be metal, including steel and/or aluminum alloys, but composite materials, plastics, polymers, wood and/or fiberglass may be used for some or all of the components.

In some embodiments, a retention device 114 may be used to further secure the tanks 14 in the rack 10. The retention device 114 may be such as a strap 116 that can be threaded through tank apertures 118, or otherwise secured to the tank 14, and the ends of the strap 116 can be secured to the rack. In some cases, the ends of the strap 116 may be fitted with releasable devices 120, such as hooks or links, to connect with the rack 10. A tensioning device 122, such as buckle and/or ratchet, may be used to selectively tighten and/or loosen the strap.

In accordance with the provisions of the patent statutes, the present device has been described in what is considered to represent its preferred embodiments. However, it should be noted that the device can be practiced otherwise than as specifically illustrated and described without departing from its spirit or scope.

What is claimed is:

1. A tank rack, comprising:
a back frame member;
a top frame member extending transverse said back frame member;
an upper frame member extending transverse said top frame member and parallel to said back frame member, said upper frame member having first and second arms;
first and second side frame members connected to said first and second arms, respectively; and
at least one U-shaped tank support member comprising:
forward portions connected to both the first and second side frame members at first connections, and
a rear portion connected to said back frame member at a second connection,
wherein upper surfaces of said forward portions at the first connections with the first and second side frame members are not coplanar with an upper surface of said rear portion at the second connection with the back frame member,
wherein at least one inwardly and downwardly support tab extends from at least one the forward portions.

2. The tank rack of claim 1, wherein at the first connections of the forward portions with the first and second side frame members, the forward portions are coplanar with one another.

3. The tank rack of claim 2, wherein said forward portions and said rear portion of said at least one tank support member have support portions adapted for directly supporting and contacting a tank and attachment portions adapted for direct attachment to the first and second side frame members and the back frame member, respectively.

4. The tank rack of claim 3, wherein the at least one support tab comprises two support tabs on said at least one tank support member that extend toward one another, wherein the support tabs are symmetrical and coplanar.

5. The tank rack of claim 1, wherein said at least one tank support member further comprises at least one first inner section and at least one second outer section, wherein said at least one second outer section extends substantially transverse said first and second side members and wherein said at least one first inner section extends between 30-70 degrees between the at least one second outer section and said back frame member.

6. The tank rack of claim 1, wherein said at least one tank support member is a plurality of tank support members vertically spaced from one another along at least the back frame member.

7. The tank rack of claim 6, wherein each of said tank support members are unitary, one piece and integrally formed.

8. The tank rack of claim 1, wherein said rear portion fits within at least one slot in said back frame member.

9. The tank rack of claim 6, wherein said forward portions and said rear portion of each of said tank support members bound a respective central open portion between the back frame member and the first and second side frame members, wherein each of the central open portions of each of the tank support members are aligned along a longitudinal axis.

10. The tank rank of claim 9, wherein the open portions provide unobstructed vertical access among the tank support members.

11. The tank rack of claim 1, wherein the upper frame member comprises a connection flange for connection with the top frame member, wherein the connection flange and the first and second arms of the upper frame member form a U-shape.

12. The tank rack of claim 1, wherein the upper frame member is symmetrical and aligned with a longitudinal axis of the tank rack.

13. The tank rack of claim 1, wherein the first and second side frame members extending a height of the back frame member and are parallel therewith.

14. The tank rack of claim 1, wherein a bottom frame member extends between the first and second side frame members, is located transverse with respect to the first and second side frame members and a portion of the bottom frame member is at least partially coplanar with the first and second side frame members and the upper frame member.

15. The tank rack of claim 9, wherein the central open portions of the tank support members are vertically connected to provide a continuous open portion.

16. The tank rack of claim 8, wherein the at least one slot comprises a plurality of slots spaced apart from one another within side flanges of the back frame member.

17. The tank rack of claim 14, wherein the back frame member comprises a panel extending from the top frame member parallel the first and second side frame members to the bottom frame member.

* * * * *